UNITED STATES PATENT OFFICE.

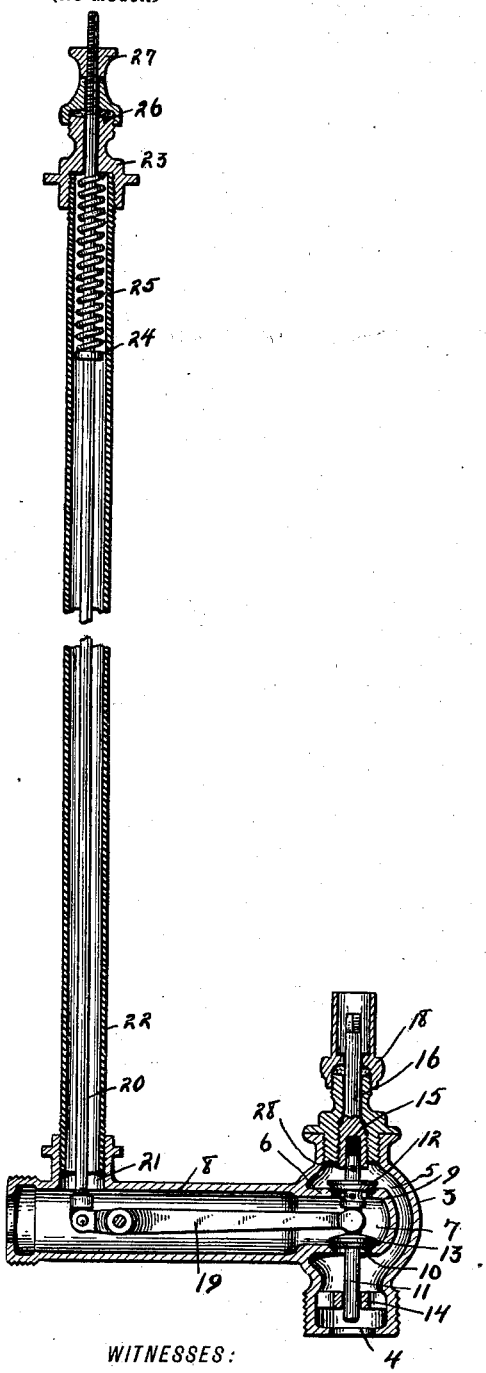

JAMES B. KNICKERBOCKER, OF INDIANAPOLIS, INDIANA, ASSIGNOR TO LANGSENKAMP BROTHERS, OF SAME PLACE.

THERMOSTAT.

SPECIFICATION forming part of Letters Patent No. 664,327, dated December 18, 1900.

Application filed March 20, 1897. Serial No. 628,434. (No model.)

*To all whom it may concern:*

Be it known that I, JAMES B. KNICKERBOCKER, a citizen of the United States, residing at Indianapolis, in the county of Marion and State of Indiana, have invented a new and useful Thermostat, of which the following is a specification.

My invention relates to an improvement in thermostats.

The objects of my invention are, first, to produce a device by means of which a supply of heating agent may be automatically controlled by the temperature of the material heated; second, to provide means for a limited constant supply of the heating agent; third, to provide means whereby said limited supply may be regulated or discontinued.

The accompanying drawing illustrates my invention.

The figure is a central vertical section of the thermostat.

In the drawing, 3 indicates a valve-casing of any desired form and provided with an inlet 4. Formed within chamber 5 of casing 3 by means of walls 6 is a chamber 7, which communicates at one end with an extension 8 of casing 3. Formed through the upper and lower walls of chamber 7 are openings 9 and 10, each provided at its upper end with a suitable valve-seat, the said openings forming a communication between chambers 5 and 7. Passing through openings 9 and 10 is a valve-stem 11, upon which are secured two valves 12 and 13, adapted to fit into the seats of openings 9 and 10, respectively. Instead of providing each valve with wings to form guides for the stem the lower end of said stem is passed through a guide 14 and the upper end thereof lies within a socket 15, formed in the lower end of a stem 16, the said stem being provided at its lower end with a seat adapted to be brought into engagement and to form a tight joint with the upper end of valve 12. Stem 16 is provided with suitable screw-threads and is vertically adjustable within a nut 17, secured to and forming a part of the casing 3. Nut 17 is provided with a stuffing-box 18, and the upper end of stem 16 is provided with means by which it may be turned and adjusted by hand within nut 17. Pivoted within the extension 8 is a lever 19, one end of which is adapted to engage stem 11 of valves 12 and 13 and the other end is adapted to be engaged by a rod 20, which passes upward through an opening 21, formed through the side of extension 8. Surrounding rod 20 is a tube 22, the elongation and contraction of which is designed to cause the operation of valves 12 and 13. Secured to the upper end of tube 22 is a nut 23, between which and a collar 24, carried by a rod 20, is mounted a spring 25. Rod 20 passes upward through nut 23 and a stuffing-box 26, carried thereby, and at its upper end is provided with screw-threads upon which is mounted an adjusting-nut 27, the said nut being adapted to be brought into engagement with the upper end of stuffing-box 26. For the purpose of allowing a limited supply of the heating agent to pass from chamber 5 to chamber 7 even when valves 12 and 13 are closed I provide a by-pass 28, which passes from the upper end of stem 11 down within said stem and emerges below valve 12, the arrangement being such that the upper end of said by-pass may be partially or entirely closed by means of stem 16.

In operation stem 16 is moved up into the position shown in the drawing. Spring 25, being under tension between collar 24 and nut 23, causes the valves 12 and 13 to open. Nut 27 is then brought into engagement with the upper end of box 26 and adjusted upon rod 20 until valves 12 and 13 are brought into the desired position. By this means the maximum opening of the valves may be regulated. The heating agent is then allowed to pass through casing 3, the said agent passing freely through openings 9 and 10 into extension 8 and from there into the distributing-pipes. Upon a rise of temperature in the air surrounding tube 22 the said tube elongates and the lower end of said tube being fixed, the upper end thereof rises and carries with it it nut 27, which is secured to rod 20, which in turn causes lever 19 to swing upon its pivot, thus lowering valves 12 and 13. If the expansion of tube 22 is sufficient, the valves may be entirely closed. In this case, supposing gas to be the heating agent, a limited amount of the gas will pass through the by-pass, thus supplying a sufficient quantity of gas to maintain a low fire until the valves are opened by the cooling of the room and a consequent contraction of tube 22. The size of the by-pass flame may be regulated by adjusting stem 16, and the fire may be entirely extinguished and the valves positively closed by bringing the lower end of stem 16 into engagement with valve 12, and thus forcing the two valves to their seats and at the same time closing the upper end of the by-pass. It will be noticed that although spring 25 is under tension the pressure upward upon nut 23 of tube 22 is counterbalanced by the pressure downward exerted by nut 27, so that there is no tendency to prevent or aid the expansion or contraction of tube 22. It will also be noticed that all of the stuffing-boxes are so arranged that no part moves therein or therethrough during the automatic action of the valve.

I claim as my invention—

1. A valve, having a by-pass passing therethrough, means for automatically operating said valve, and independent means for regulating the by-pass and for positively closing the valve.

2. A valve, having a by-pass passing therethrough, means for automatically operating said valve, and means for positively closing the valve and by-pass.

3. A valve, provided with a suitable stem and having a by-pass passing therethrough, and an adjustable stem provided with a socket adapted to receive the valve-stem and pass over the by-pass, as and for the purpose set forth.

4. A valve, provided with a suitable stem and having a by-pass passing through said stem, and an adjustable stem provided with a socket adapted to receive the valve-stem and to pass over the mouth of the by-pass, the said adjustable stem being also provided with means to positively engage the valve or its stem and to positively close said valve.

5. A valve, provided with a suitable stem and having a by-pass passing through said stem, an opening into the casing permitting the introduction of the valve, a cap for closing said opening, a stem passing through said cap and longitudinally adjustable therethrough, a socket formed in the inner end of said stem and adapted to receive the valve-stem and to pass over the mouth of the by-pass, whereby the by-pass may be regulated and the valve positively closed by the said adjustable stem, substantially as and for the purpose set forth.

JAMES B. KNICKERBOCKER.

Witnesses:
MARVIN B. CRIST,
EDWARD KIRKPATRICK.